United States Patent
Nudelman et al.

(10) Patent No.: US 10,959,455 B1
(45) Date of Patent: Mar. 30, 2021

(54) CHEWING GUM HAVING ENCAPSULATED CANNABINOIDS

(71) Applicants: David R. Nudelman, Denver, CO (US); Amy Ellen Nudelman, Denver, CO (US); Charles Schwartz, Hul, MA (US)

(72) Inventors: David R. Nudelman, Denver, CO (US); Amy Ellen Nudelman, Denver, CO (US); Charles Schwartz, Hul, MA (US)

(*) Notice: Subject to any disclaimer, the term of this patent is extended or adjusted under 35 U.S.C. 154(b) by 0 days.

(21) Appl. No.: 17/113,782

(22) Filed: Dec. 7, 2020

(51) Int. Cl.
  *A24B 15/30* (2006.01)
  *A24B 15/40* (2006.01)
  *A24B 15/28* (2006.01)
  *A24B 15/16* (2020.01)

(52) U.S. Cl.
  CPC ............ *A24B 15/303* (2013.01); *A24B 15/16* (2013.01); *A24B 15/283* (2013.01); *A24B 15/403* (2013.01)

(58) Field of Classification Search
  None
  See application file for complete search history.

(56) References Cited

U.S. PATENT DOCUMENTS

| | | | |
|---|---|---|---|
| 5,171,589 A * | 12/1992 | Richey | A23G 4/066 426/3 |
| 6,949,264 B1 * | 9/2005 | McGrew | A23G 4/06 424/440 |
| 2020/0138772 A1 * | 5/2020 | Berl | A61K 31/05 |

FOREIGN PATENT DOCUMENTS

WO  WO 2020/037410 A1 * 2/2020

* cited by examiner

*Primary Examiner* — Dennis R Cordray
(74) *Attorney, Agent, or Firm* — Block 45 Legal LLC

(57) ABSTRACT

A cannabinoid compound for inclusion into a chewing product, having an active emulsion having a cannabinoid resin with a concentration of about 0.00% to about 100% THC, preferably 81.64% THC in a mixture of 816.4 mg THC/1 g concentrate in a mixture having a ratio of the following ingredients: gum arabic approximately 20.00% to approximately 50.00%, preferably 39.18%, water approximately 30.00% to approximately 60.00%, preferably 46.55%, vitamin E as d-alpha tocopherol from 0.00% to approximately 4.70%, preferably 4.70%, polysorbate 80 (surfactant/emulsifier) approximately 0.00% to approximately 1.5%, preferably 1.18%, and cannabinoid concentrate THC@0.00%-100%, from approximately 1.00% to approximately 50.00%, preferably 8.39%.

16 Claims, 6 Drawing Sheets

US 10,959,455 B1

CHEWING GUM HAVING ENCAPSULATED CANNABINOIDS

FIELD OF THE INVENTION

The present invention relates broadly to chewing gum. Specifically, the present invention relates to application of cannabinoids to chewing gum pieces.

BACKGROUND OF THE INVENTION

Human consumption of cannabinoids is finding rapidly increasing acceptance by governments both in medical and recreational applications. The most common method of consuming cannabinoids is through smoking *cannabis* in its raw form, either encased in cigarette papers or through pipes of various designs. Much effort has been expended to filter out the carcinogens that accompany smoking *cannabis*. Water pipes draw smoke from burning *cannabis* through one or more volumes of water, but this mostly removes burning embers and particulate matter from the flow of smoke from the burning *cannabis* into the user's lungs, but dangerous gases, such as carbon monoxide still are ingested by the user, which may lead to severe cardiac and respiratory illnesses.

Edible forms of *cannabis* are a popular consumption choice. Concentrated forms of cannabinoids are cooked into brownies, cakes, cookies, and confectionary items such as lollipops and hard candies. This method completely eliminates the dangers associated with inhaling smoke.

SUMMARY OF THE INVENTION

In one aspect, the present invention provides a cannabinoid compound for inclusion into a chewing product, having an active emulsion having a cannabinoid resin with a concentration of 0.00% to 100% THC in a first mixture of between 0 mg and 1000 mg THC/1 g concentrate in a mixture having a ratio of the following ingredients: gum arabic approximately 20.00% to approximately 50.00%, preferably 39.18%, water approximately 30.00% to approximately 60.00%, preferably 46.55%, vitamin E as d-alpha tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@ 0.00% to 100%, from approximately 1.00% to approximately 50.00%, preferably 8.39%.

In another aspect, the present invention provides a cannabinoid compound having an active powder that includes a cannabinoid resin having a concentration of 0.00% to 100% THC (0 mg to 1,000 mg THC/1 g concentrate) mixed with at least one of a group consisting of: modified food starch, soy protein, maltodextrin, surfactant and emulsifier (other than polysorbate 80), in an aqueous solution.

DETAILED DESCRIPTION OF THE INVENTION

Directing attention generally to the FIGS, chewing gum is the preferred medium to which cannabinoids are applied in accordance with the present invention. Chewing gum pieces are described herein in many different forms, including tablet chewing gum, extruded chewing gum, center-filled chewing gum, coated chewing gum, and the like, depending on the process applied to chewing gum pieces.

Reference is made herein to specialized equipment utilized in the manufacturing processes described herein. As is commonly used in the confectionary industry, with particular application to the manufacture of chewing gum pieces, manufacturing processes described herein include ovens, freeze dryers, spray dryers, and panning chambers. Ovens remove moisture by heating the items contained within a chamber to which heat is applied. Spray dryers remove moisture by spraying a liquid or semisolid mixture into a heated cylinder at a rate that allows evaporation to occur as the liquid or semisolid mixture is sprayed into the cylinder. Freeze dryers first freeze small amounts of a product and then place the frozen portions under vacuum. The frozen liquid sublimates. Ice changes to vapor without defrosting. It is a repetitive process. The radiation first works on outermost portion dewaters. Through repetition, additional water is removed until the core of the product is dewatered. The structure of the product stays intact and the majority of the taste, of the texture and of the nutrients remain intact. In some embodiments, dehydration is effected through a combination of freeze drying followed by spray drying.

Panning operations are a key operation in embodiments of the invention. Panning is a process through which gum pieces are tumbled on a vibrating or moving surface, and liquids and semisolid mixtures are applied to the surface of the gum pieces as they tumble. Panning can be performed through the use of panning tables or, for larger batches, panning chambers. Panning chambers operate by tumbling gum pieces in a substantially cylindrical or spherical volume, similar to a washing machine, that spinning at a slower speed to effectively apply coatings to gum pieces.

Figure 1:
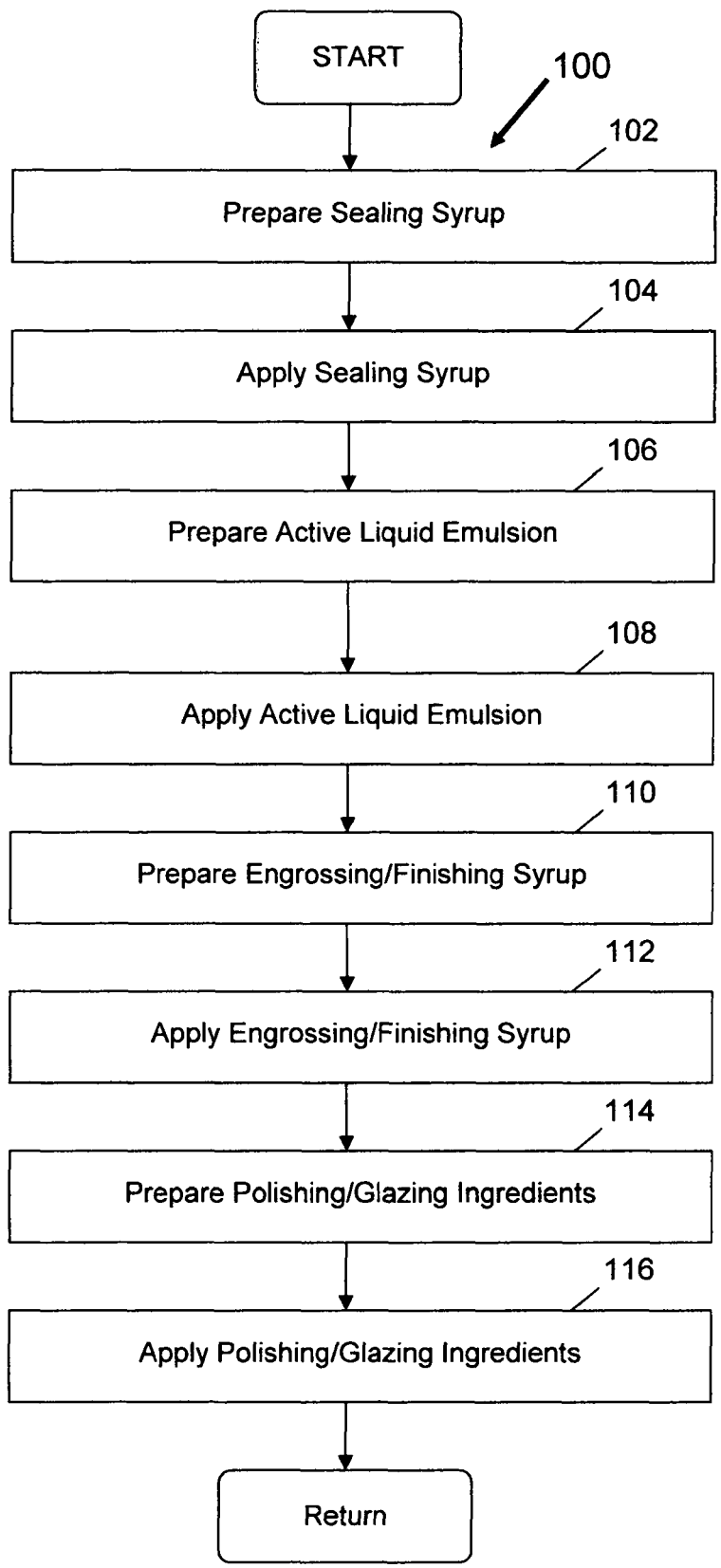
FIG. 1 is a sequence of operational steps for applying cannabinoids to a chewing gum as a liquid coating.

The following processes described herein encapsulate cannabinoid compounds in various embodiments to form a power or liquid for application to chewing gum pieces. Directing attention to FIG. 1, process 100 involves panning operations. Panning room conditions are critical to the success of the finished product. Ideally, the panning room should be between 65-70° F. (18.3-21.10 C) with a relative humidity around 25-30%. Too much humidity can cause condensation on the gum centers preventing the shell from adhering. This will also make it difficult to dry the layers properly. Additionally, gum centers should be conditioned to the room environment before panning. If conditions are acceptable, determine the quantity of gum to be coated and place in a panning chamber.

At step 102, sealing syrup is prepared with the following ingredients to fully coat the gum pieces. The amount of sealing syrup required is approximately 5% or less of the total weight for gum being sealed. This is a recommended optional step of sealing the center to help adhesion of the shell and help isolate the active layer. Proportions for the mixture include: gum Arabic, TicaPAN 311®, TicaPAN Quick Crunch® or other functional matching binder or stabilizer 60%; and water 40%. Add Stabilizer to water and mix. Once completely dispersed heat to 185 F and mix to achieve a homogenous mixture. Stop mixing and allow solution to cool down to approximately 110-160 F. Remove foam from surface of the mixture.

At step 104, the sealing syrup prepared at step 102 is applied to gum pieces. Turn panning chamber on, making the gum pieces tumble as panning chamber rotates. Apply the sealing syrup prepared in step 102 to gum pieces a little at a time. Be careful not to over-saturate gum pieces or they will start to stick together. Dusting powder may be required to assist in drying. Dusting powder can consist of a fine ground sugar or sugar alcohol usually the same as the syrup. For this sealing syrup use either TicaPAN® Seal or other functional matching equivalent, or Isomalt (sugar alcohol). Allow the applied sealing syrup and pieces to dry prior to applying subsequent application. Application of the sealing syrup is repeated one to two more times for optimum sealing. Allow coated gum pieces to dry.

At step 106, an active liquid emulsion is prepared. Combine measured amount of cannabinoids and/or cannabinoid resin with the ingredients listed below. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g Concentrate). The ratio of ingredients typically is: gum arabic approximately 20.00% to approximately 50.00%, preferably 39.18%, water approximately 30.00% to approximately 60.00%, preferably 46.55%, vitamin E as d-alpha tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@ 0.00%-100%, from approximately 1.00% to approximately 50.00%, preferably 8.39%. Combine gum Arabic with cold water and mix until fully incorporated. Add to the gum Arabic mixture vitamin E, cannabinoids and/or cannabinoid resin (concentrate), and polysorbate 80. The resultant mixture is heated to approximately 120 degrees F. for approximately 5-10 minutes and mixed to provide a homogeneous mixture (note: if cannabinoids and/or cannabinoid resin have not been decarboxilated, heat at approximately 185 F for a min of 10 minutes). Optionally, for nanoencapsulation, the mixture is blended using a high-shear mixer or sonication, or other method. The result of this optional blending is a nanoemulsion. The resultant homogeneous mixture is now ready to be applied as a liquid in the chewing gum coating.

At step 108, the active liquid emulsion prepared at step 106 is applied to the coated gum pieces. The active liquid emulsion should be kept warm during this process and kept at a temperature of approximately 110-160 F, so it remains fluid. It is important the active liquid emulsion is fluid so all the gum pieces are coated. Apply the active liquid emulsion to the gum pieces a little at a time until fully coated. Be careful not to over-saturate the gum pieces or they will start to stick together. Dusting powder may be required to assist in drying. Dusting powder can consist of a fine ground sugar or sugar alcohol usually the same as the syrup. For this application, use either TicaPAN 311 or other functional matching equivalent, or Isomalt (sugar alcohol). Allow gum pieces to dry between applications. Apply subsequent coats of the active liquid emulsion, allowing pieces to dry between applications, until all of the required active liquid emulsion is applied in the coating process to yield the specified dosage for each of chewing gum pieces. Allow gum pieces to dry.

At step 110, an engrossing/finishing syrup is prepared with the ingredients listed below, to fully coat gum pieces. The syrup can be prepared with sugar or, for sugar-free gum, sugar alcohol. The amount of syrup required is approximately 25% or less of the total weight for gum pieces being sealed. Flavor and color can be added if desired, typically at 0.5-2% of the syrup weight; intensive sweetener such as sucralose, typically at 0.66% or less, of the syrup weight; acidulants typically at 12% or less of the syrup weight. The amount of sugar or alcohol is decreased to accommodate the added ingredients. The preferred ratio of ingredients for the engrossing/finishing syrup is: finely-ground sugar or isomalt-sugar alcohol (for sugar-free gum) 60%, water 37%, TicaPAN 311®, TicaPAN Quick Crunch®, gum Arabic or other functional matching binder/stabilizer 3%. Add binder/stabilizer to water and mix until completely dispersed. Begin heating and add isomalt to the solution in small increments, allowing the isomalt to dissolve. Continue adding isomalt to the solution until the measured amount has been added. Continue heating until temperature of solution reaches 212 F. Cool solution to proper temperature and adjust brix as required. Brix (symbol ° Bx) is the sugar content of an aqueous solution. A refractometer is used for measuring brix. For finishing with isomalt, the engrossing/finishing syrup should measure 60-63 Bx at temperature of 140-160 F. Brix may need to be adjusted depending on humidity, temperature and altitude. To increase Brix, add sugar alcohol incrementally and allow to fully dissolve, until desired Brix is achieved. To decrease brix, add water incrementally and allow to fully incorporate, until desired brix is achieved.

At step 112, the engrossing/finishing syrup prepared at step 110 is applied to gum pieces. The syrup should be kept at 60-63 Bx and temperature of 140-160 F. Apply syrup to gum pieces a little at a time until fully coated. Be careful not to over-saturate gum pieces or they will start to stick together. Allow gum pieces to dry between applications. Apply subsequent coats of the engross/finishing syrup, allowing gum pieces to dry between applications, until the desired finish weight is achieved and pieces are smooth. Remove coated pieces from panning chamber and allow to dry for approximately 12-48 hours.

For bioencapsulation of cannabinoids, gum pieces are coated in panning chamber with a specialized polymer, and the porosity of the specialized polymer can be selected for the benefit of controlled release of the active cannabinoids. If bioencapsulation is performed, the remaining steps are optional.

At step 114, a polishing wax/glaze is prepared using the following polishing ingredients: carnauba wax powder, bees wax powder, combination of bees wax and carnauba wax powder, or functional matching polishing agent (0.10% or less of the total weight for coated gum being polished). Confectioners glaze, food grade shellac, or functional matching glazing agent. The amount of glaze required is typically 0.29% or less of the total weight for coated gum being glazed.

At step 116, the polishing wax/glaze prepared at step 114 is applied to coated gum pieces. Place dry, coated gum pieces into panning chamber and turn panning chamber on to begin spinning. While panning chamber is spinning, sprinkle the measured amount of wax powder over gum pieces a little at a time to coat all of the pieces. As the chamber spins the wax will disperse over all the tumbling gum pieces. Allow panning chamber to continue spinning for up to 30 minutes but typically 10-15 minutes until a glossy finish is achieved. Additional wax may be applied if the desired gloss is not achieved. While panning chamber is spinning, apply glaze by slowly pouring over tumbling gum. Continue spinning till all gum pieces are evenly coated. Stop panning chamber and let coated gum pieces dry. Jog the panning chamber by turning unit on and allowing to spin for approximately 5 seconds or less, and then turn back off. Repeat the jogging process approximately every 3 minutes until gum pieces are dry. Remove completed gum pieces from panning chamber and allow to condition for approximately 12 hours before packaging. Finished product should be conditioned in a room that is cool and dry.

Figure 2:
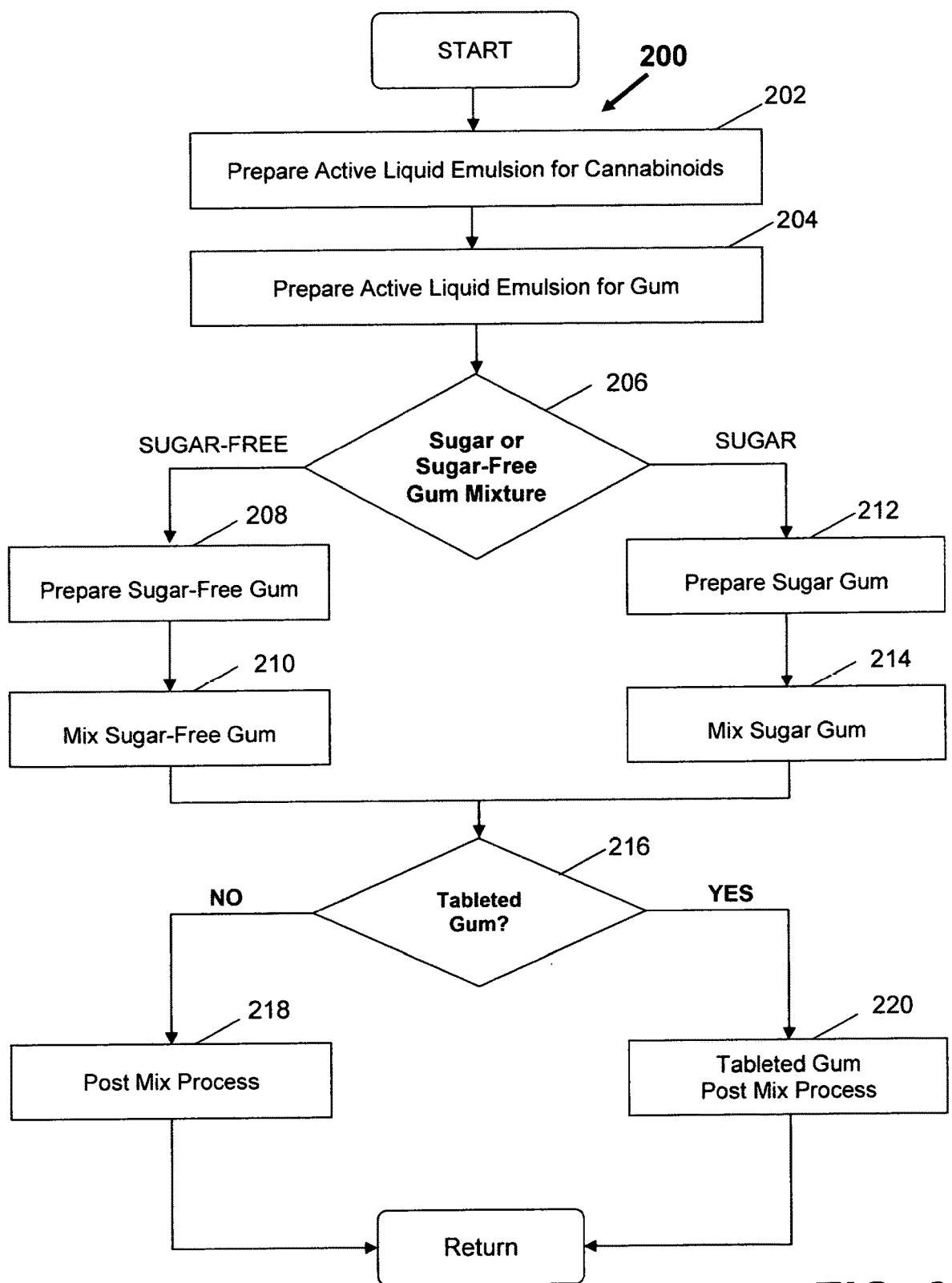
FIG. 2 is a sequence of operational steps for applying cannabinoids to chewing gum in a gum mixture.

Directing attention to FIG. 2, microencapsulation of cannabinoids in an active liquid emulsion applied to a chewing gum mixture is illustrated as process 200. Beginning at step 202, an active liquid emulsion is prepared. This step is similar to step 106 in FIG. 1. Combine measured amount of cannabinoids and/or cannabinoid resin with the ingredients listed below. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g Concentrate). The ratio of ingredients typically is: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, cannabinoid concentrate THC@ 0.00%-100%, from approximately 1.00% to approximately 50.00%, preferably 8.39%. Combine gum Arabic with cold water and mix until fully incorporated. Add to the gum Arabic mixture vitamin E, cannabinoids and/or cannabinoid resin (concentrate), and polysorbate 80. The resultant mixture is heated to approximately 120 degrees F. for approximately 5-10 minutes and mixed to provide a homogeneous mixture (note: if cannabinoids and/or cannabinoid resin have not been decarboxilated, heat at approximately 185 F for a min of 10 minutes). Optionally, for nanoencapsulation, the mixture is blended using a high-shear mixer or sonication, or other method. The result of this optional blending is a nanoemulsion. The resultant homogeneous mixture is now ready to be applied as a liquid in the chewing gum mixture.

At step 204, an active liquid emulsion for gum mixture is prepared. Prepare Active Liquid Emulsion for Gum Mixture. Combine the Active Liquid Emulsion with sugar, sugar alcohol or binder (typically the same sugars, sugar alcohols, or binders that are used in the gum mixture) and mix for a uniform distribution. For this application, Isomalt (sugar alcohol) will be used. Note: the active liquid emulsion can also be blended with all or some of the powders and liquids, including liquid flavors, that are blended together for the gum mixture. Active liquid emulsion from step 202: 50%. Polyol such as isomalt (for sugar-based gum use sugar instead of isomalt): 50% or greater.

At decision step 206, a selection is made between producing the present invention as a sugar-free gum or a sugared gum. For sugar-free gum pieces, steps 208, and 210 are performed. For sugared gum pieces, steps 212 and 214 are performed.

At step 208, a sugar-free gum mixture is prepared using the ingredients below. Combine the bulk sweeteners that are in powder form, including the active liquid emulsion mix, for making the gum mixture and blend until fully incorporated. Typical mix time is 5 minutes, but could be more or less depending on mixer used and degree of incorporation. The balance of powder ingredients can be added and mixed for additional time until fully incorporated. For tableted chewing gum the liquid phase is lowered to 0.00-10.00% and is replaced with other ingredients in the formulation such as more bulk sweeteners: gum base 25.00-35.00%; bulk sweeteners (ie: sorbitol, xylitol, maltitol, isomalt, etc.) 40.00-55.00%; liquid phase (syrup) 8.00-20.00%; active liquid emulsion (% indicated is for active liquid emulsion only) 5.00-30.00%; intensive sweeteners 0.20-0.40%; flavors 1.00-2.00%; plasticizers 0.50-8.00%; and acids 0.00-2.00%.

At step 210, a mixing process is performed for sugar-free chewing gum. The following details the typical sequences for batch process, but sequences may change based on equipment, batch size, method (tableted gum, injection-molded gum), formula, etc. Also, the active liquid emulsion mixture described above, without combining the other sugar alcohols, can be added at other times in the sequence. Mixing times can vary, depending on formulation, mixer, temperature, etc. The indicated bulk sweeteners may also include all or some of the powder ingredients used in the mixture in addition to liquids. If so, the ingredients indicated in the sequence steps should be eliminated as they are present in the combined mixture. Typical sequences for Sugar-Free Chewing Gum, but not limited to the following: Add gum base+liquid phase (rotate mixer until base softens). Then add ⅓ of bulk sweeteners+intensive sweeteners. Mix for approximately five minutes and add another ⅓ of bulk sweeteners. Mix for approximately five minutes again, then add flavors, plasticizers, acids and the remaining ⅓ of bulk sweeteners. Mix for approximately five minutes again and unload the homogenous mass from the mixer.

Returning to step 212-214, the process steps for sugar gum are followed. At step 212, sugar gum mixture is prepared using the ingredients below. Combine the sugars that are in powder form, including the active liquid emulsion mixture, and blend until fully incorporated. Typical mix time is approximately 5 minutes, but could be more or less depending on mixer used and degree of incorporation. The balance of powder ingredients can be added and mixed for additional time until fully incorporated. For tableted chewing gum the liquid phase is lowered to 0.00-10.00% and is replaced with other ingredients in the formulation such as more sugar. Typical formulations are: gum base 15.00-25.00%; sugar 45.00-65.00%; liquid phase (glucose) 15.00-23.00%; active liquid emulsion (% indicated is for active liquid emulsion only) 5.00-30.00%; flavors 0.60-2.00%; plasticizers 0.20-1.00%; and acids 0.00-2.00%.

At step 214, the mixing process for sugar gum is performed. The following details the typical sequences for batch process, but sequences may change based on equipment, batch size, method (ie: tableted gum, injection-molded gum), formula, etc. Also, the active liquid emulsion mixture, without combining the sugars, can be added at other times in the sequence. Mixing times can vary, depending on formulation, mixer, temperature, etc. The indicated sugar may also include all or some of the powder ingredients used in the mixture in addition to liquids. If so, the ingredients indicated in the sequence steps should be eliminated as they are present in the combined mixture. Add: ⅓ of the sugar (rotate), gum base, liquid phase. Mix for approximately five minutes. Add another ⅓ sugar and mix for approximately two minutes. Add: flavors, plasticizers, and acids. Mix for approximately three minutes. Add: the remaining ⅓ of the sugar and mix for approximately five minutes and remove the homogeneous mass from the mixer.

For bioencapsulation of cannabinoids, gum pieces are coated in panning chamber with a specialized polymer, and the porosity of the specialized polymer can be selected for the benefit of controlled release of the active cannabinoids.

At decision step 216, a selection is made between post mixing steps for extruded gum and injection-molded gum, or tableted chewing gum.

At step 218, the post-mixing process for extruded gum and injection-molded gum is performed. Typical operations in step 218 include but are not limited to curing, injection molding, extruding, curing, rolling and scoring, forming, coating and packaging.

At step 220, the post-mixing process for tableted chewing gum is performed. Typical operations include but are not limited to curing, milling, mixing with process-aid ingredients added for tableting, in addition to optional dietary supplements. The prepared active liquid emulsion mixture described above can be included in this step rather than earlier as described, depending on the desired release of cannabinoids. Additional ingredients added at this point may include stearate, typically magnesium or calcium and the like, in a proportion of approximately 0.50-5.00% of the total mixture. Silicon dioxide can also be added at this point in a proportion of approximately 0.10-2.00%. Additional operations include tableting, coating and packaging.

Figure 3:
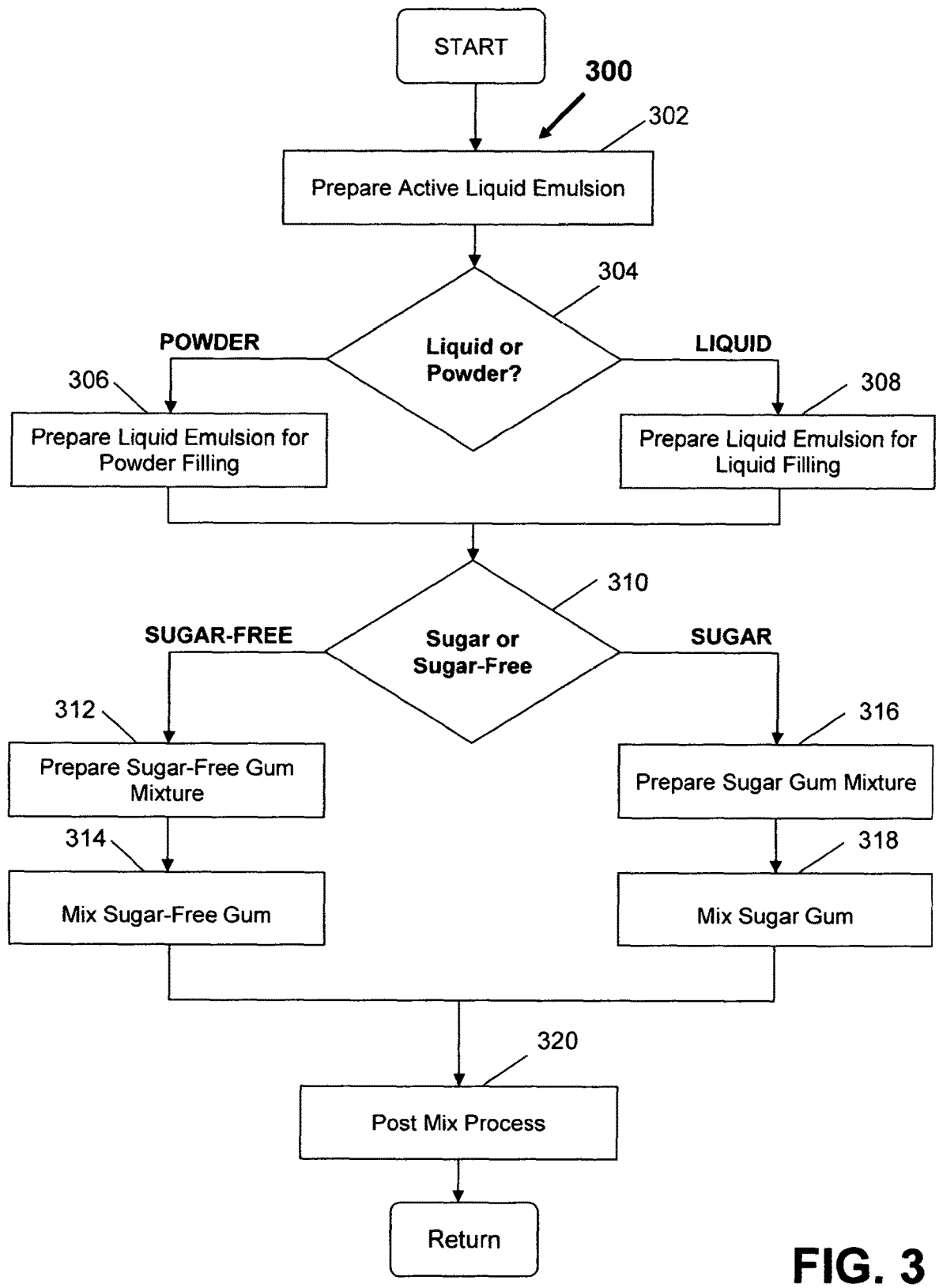
FIG. 3 is a sequence of operational steps for applying cannabinoids to chewing gum in a gum center filling.

Directing attention to FIG. 3, a process for applying active liquid emulsion applied to chewing gum center filling is illustrated as process 300. Beginning at step 302, an active liquid emulsion is prepared. This step is similar to step 202 in FIG. 2. Combine measured amount of cannabinoids and/or cannabinoid resin with the ingredients listed below. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g Concentrate). The ratio of ingredients typically is: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine gum Arabic with cold water and mix until fully incorporated. Add to the gum Arabic mixture vitamin E, cannabinoids and/or cannabinoid resin (concentrate), and polysorbate 80. The resultant mixture is heated to approximately 120 degrees F. for approximately 5-10 minutes and mixed to provide a homogeneous mixture (note: if cannabinoids and/or cannabinoid resin have not been decarboxilated, heat at approximately 185 F for a min of 10 minutes). Optionally, for nanoencapsulation, the mixture is blended using a high-shear mixer or sonication, or other method. The result of this optional blending is a nanoemulsion. The resultant homogeneous mixture is now ready to be applied as a liquid in the chewing gum manufacturing process.

At decision step 304, a selection is made between preparing a gum center powder filling and a gum center liquid filling.

At step 306, an active liquid emulsion for gum center powder filling is performed. The active liquid emulsion is combined with sugar, sugar alcohol (for sugar-free gum) or other ingredients that may be in the chewing gum powder filling. The following gum center filling mixture is an example and may vary based on desired color, flavor, nutritional supplement and texture profile. In an embodiment, the proportions are: active liquid emulsion 50%; polyol such as isomalt (for sugar-based gum use sugar) 40% or greater; citric acid 8% or greater and flavor 2% or less.

At step 308, an active liquid emulsion for gum center liquid filling is performed. The active liquid emulsion is combined with a liquid polyol, glucose or other ingredients that may be used in the chewing gum liquid filling. The following gum center filling mixture may vary based on expected color, flavor, nutritional supplement and texture profile desired. The proportions are: active liquid emulsion 50%; liquid polyol such as maltitol syrup (sugar-free) or glucose (sugar) 40% or greater; citric acid 8% or greater: and flavor 2% or less.

At decision step 310, a selection is made between producing the present invention as a sugar-free gum or a sugared gum. For sugar-free gum pieces, steps 312 and 314 are performed. For sugared gum pieces, steps 316 and 318 are performed.

At step 312, a sugar-free gum mixture is prepared using the ingredients below. Combine the bulk sweeteners that are in powder form, including the active liquid emulsion mix, for making the gum mixture and blend until fully incorporated. Typical mix time is 5 minutes, but could be more or less depending on mixer used and degree of incorporation. The balance of powder ingredients can be added and mixed for additional time until fully incorporated. For tableted chewing gum the liquid phase is lowered to 0.00-10.00% and is replaced with other ingredients in the formulation such as more bulk sweeteners: gum base 25.00-35.00%; bulk sweeteners (ie: sorbitol, xylitol, maltitol, isomalt, etc.) 40.00-55.00%; liquid phase (syrup) 8.00-20.00%; active liquid emulsion (% indicated is for active liquid emulsion only) 5.00-30.00%; intensive sweeteners 0.20-0.40%; flavors 1.00-2.00%; plasticizers 0.50-8.00%; and acids 0.00-2.00%.

At step 314, a mixing process is performed for sugar-free chewing gum. The following details the typical sequences for batch process, but sequences may change based on equipment, batch size, method (tableted gum, injection-molded gum), formula, etc. Also, the active liquid emulsion mixture described above, without combining the other sugar alcohols, can be added at other times in the sequence. Mixing times can vary, depending on formulation, mixer, temperature, etc. The indicated bulk sweeteners may also include all or some of the powder ingredients used in the mixture in addition to liquids. If so, the ingredients indicated in the sequence steps should be eliminated as they are present in the combined mixture. Typical sequences for sugar-free chewing gum, but not limited to the following: Add gum base+liquid phase (rotate mixer until base softens). Then add ⅓ of bulk sweeteners+intensive sweeteners. Mix for approximately five minutes and add another ⅓ of bulk sweeteners. Mix for approximately five minutes again, then add flavors, plasticizers, acids and the remaining ⅓ of bulk sweeteners. Mix for approximately five minutes again and unload the homogenous mass from the mixer.

Returning to step 316, the process steps for sugar gum are followed. At step 316, sugar gum mixture is prepared using the ingredients below. Combine the sugars that are in powder form, including the active liquid emulsion mixture, and blend until fully incorporated. Typical mix time is approximately 5 minutes, but could be more or less depending on mixer used and degree of incorporation. The balance of powder ingredients can be added and mixed for additional time until fully incorporated. For tableted chewing gum the liquid phase is lowered to 0.00-10.00% and is replaced with other ingredients in the formulation such as more sugar. Typical formulations are: gum base 15.00-25.00%; sugar 45.00-65.00%; liquid phase (glucose) 15.00-23.00%; active liquid emulsion (% indicated is for active liquid emulsion only) 5.00-30.00%; flavors 0.60-2.00%; plasticizers 0.20-1.00%; and acids 0.00-2.00%.

At step 318, the mixing process for sugar gum is performed. The following details the typical sequences for batch process, but sequences may change based on equipment, batch size, method (ie: tableted gum, injection-molded gum), formula, etc. Also, the active powder mixture can be added at other times in the sequences. Mixing times can vary, depending on formulation, mixer, temperature, etc. The indicated sugar may also include all or some of the powder ingredients used in the mixture in addition to liquids. If so, the ingredients indicated in the sequence steps should be eliminated as they are present in the combined mixture. Add: ⅓ of the sugar (rotate), gum base, liquid phase. Mix for approximately five minutes. Add another ⅓ sugar and mix for approximately two minutes. Add: flavors, plasticizers, and acids. Mix for approximately three minutes. Add: the remaining ⅓ of the sugar and mix for approximately five minutes and remove the homogeneous mass from the mixer.

To achieve bioencapsulation, due to the active liquid emulsion in the liquid or powder center of the chewing gum piece, the pieces can undergo an additional coating process in panning chamber, in which a specialized polymer is applied to the chewing gum pieces with filled centers. The polymer coating can be adjusted for porosity for controlled release of the active liquid emulsion.

At step 320 the post-mixing process for extruded chewing gum with hollow center for filling is performed. Typical operations include but are not limited to curing and extruding gum pieces with a hollow center. The hollow center is filled with a measured quantity of the active emulsion, either powder or liquid, formed in the steps above. Gum pieces are rolled, scored and formed, coated, and packaged.

Figure 4:
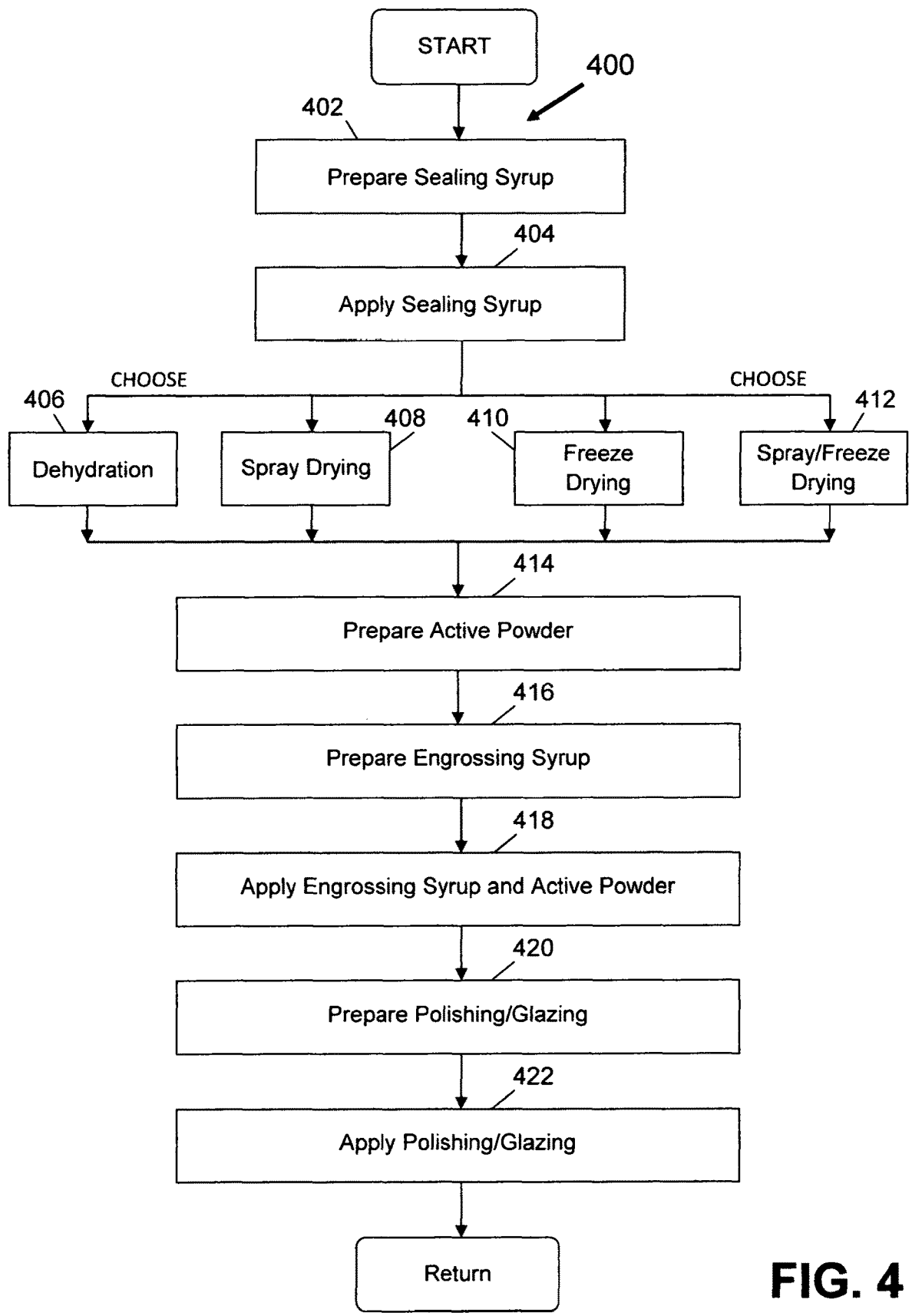
FIG. 4 is a sequence of operational steps for applying cannabinoids to chewing gum as a powder in the coating.

Directing attention to FIG. 4, microencapsulation of cannabinoids applied to chewing gum as a powder for coating is illustrated as process 400. As described above in FIG. 1, panning room conditions are critical to the success of the finished product. Ideally, the panning room should be between 65-70° F. (18.3-21.10 C) with a relative humidity around 25-30%. Too much humidity can cause condensation on the gum centers preventing the shell from adhering. This will also make it difficult to dry the layers properly. Additionally, gum centers should be conditioned to the room environment before panning. If conditions are acceptable, determine the quantity of gum to be coated and place in panning chamber.

At step 402, sealing syrup is prepared with the following ingredients to fully coat the gum pieces. The amount of sealing syrup required is approximately 5% or less of the total weight for gum being sealed. This is a recommended optional step of sealing the center to help adhesion of the shell and help isolate the active layer. Proportions to mix include Gum Arabic, TicaPAN 311®, TicaPAN Quick Crunch® or other functional matching binder or stabilizer 60%. Water 40%. Add Stabilizer to water and mix. Once completely dispersed heat to 185 F and mix to achieve a homogenous mixture. Stop mixing and allow solution to cool down to approximately 110-160 F. Remove foam from surface.

At step 404, the sealing syrup prepared at step 402 is applied to gum pieces. Turn panning chamber on, making the gum pieces tumble as panning chamber rotates. Apply the sealing syrup prepared in step 402 to gum pieces a little at a time. Be careful not to over-saturate gum pieces or they will start to stick together. Dusting powder may be required to assist in drying. Dusting powder can consist of a fine ground sugar or sugar alcohol usually the same as the syrup. For this sealing syrup use either TicaPAN Seal or other functional matching equivalent, or Isomalt (sugar alcohol). Allow the applied sealing syrup and pieces to dry prior to applying subsequent application. Application of the sealing syrup is repeated one to two more times for optimum sealing. Allow coated gum pieces to dry.

A determination is then made as to how to prepare an active liquid emulsion containing cannabinoids. Described herein are processes for heated dehydration, spray-drying, freeze-drying, and spray-freeze-drying, one of which may be selected for this embodiment of the present invention.

At step 406, for dehydration, an active liquid emulsion for dehydration is prepared. Measured amounts of cannabinoids and/or cannabinoid resin are combined with the ingredient proportions listed below and blended to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g Concentrate): water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine the gum Arabic with cold water and mix until fully incorporated. Add to the gum Arabic mixture Vitamin E, cannabinoids and/or cannabinoid resin (concentrate), and polysorbate 80. The resultant mixture is heated to approximately 120 degrees F. for approximately 5-10 minutes and mixed to provide a homogeneous mixture. To perform nanoencapsulation, the mixture is blended using a high-shear mixer or sonication. The result is a nanoemulsion. Set oven temperature to 175 degrees F. Pour active liquid emulsion onto an oven-safe nonstick sheet and spread evenly. Place in oven for approximately 45-90 minutes. As the active liquid emulsion dries, it rises from the non-stick sheet. After the active liquid emulsion is dried, remove it from the oven and allow cooling to room temperature. The resultant active dried mixture is turned into a fine powder by pulverizing and/or grinding.

Alternatively, at step 408, an active liquid emulsion for spray-drying is prepared. Combine measured amount of cannabinoids and/or cannabinoid resin with the proportions of listed ingredients below and blend to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g concentrate). Additionally, one or more of the following ingredients can be used in the mixture which include, but are not limited to: modified food starch, soy protein, maltodextrin, surfactant and emulsifier (other than polysorbate 80), in an aqueous solution to create a slurry. The proportions of ingredients to be mixed are: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, cannabinoid concentrate THC@0.00%-100%, from approximately 1.00% to approximately 50.00%, preferably 8.39%. Combine the gum Arabic with cold water and mix until fully incorporated. Add to the gum Arabic solution vitamin E, cannabinoids and/or cannabinoid resin (concentrate), and polysorbate 80 to create a slurry. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Add additional aqueous solution as necessary for the atomization method chosen using an applicable solvent. Set inlet temperature to approximately 170 degrees F., using two fluid nozzles. This is dependent on the spray-drying method and preparation method chosen. Collect the dry active powder. If necessary, the dry active powder can be further reduced in particle size by pulverizing and/or grinding.

Alternatively, at step 410, an active liquid emulsion for lyophilizaton (freeze-drying) is performed. Combine measured amount of cannabinoids and/or cannabinoid resin with the listed ingredients and blend to create a homogeneous mix. The ratio of ingredients may vary from batch to batch based on the % of active cannabinoids present in the cannabinoids and/or cannabinoid resin used. The ingredient percentages noted are based on using cannabinoid resin with a concentration of 81.64% THC (816.4 mg THC/1 g concentrate). Additionally, one or more of the following ingredients can be used in the mixture which include, but are not limited to: modified food starch, gelatin, maltodextrin, chitosan, surfactant and emulsifier (other than polysorbate 80). The proportions to mix for the active liquid emulsion include: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine gum Arabic with cold water and mix until fully incorporated. Add to the gum Arabic solution vitamin E, cannabinoids and/or cannabinoid resin (concentrate), and polysorbate 80. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Pre-freeze the active mixture to approximately −40 to −80 C. Shell freezing is recommended. Cool condenser to approximately 20 C. Evacuate to at least 0.066 mBar, using vacuum pump. Gradually apply heat to allow sublimination to occur. Dry until the active mixture appears completely dry. Temperature and time may vary depending on the freeze drying method and preparation method chosen. The resultant dry active is converted into a fine powder by pulverizing and/or grinding.

Alternatively, at step 412, an active liquid emulsion is prepared for spray-freeze-drying (SFD). Combine measured amount of cannabinoids and/or cannabinoid resin with the listed ingredients and blend to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g concentrate). Additionally, one or more of the following ingredients can be used in the mixture which include, but are not limited to: modified food starch, soy protein, maltodextrin, surfactant and emulsifier (other than polysorbate 80), in an aqueous solution to create a slurry. The proportion of ingredients for the active liquid emulsion include: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, cannabinoid concentrate THC@0.00%-100%, from approximately 1.00% to approximately 50.00%, preferably 8.39%. Combine gum Arabic with cold water and mix until fully incorporated. Add to the gum Arabic solution vitamin E, cannabinoids and/or cannabinoid resin (concentrate), and polysorbate 80 to create a slurry. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Add additional aqueous solution as necessary for the atomization method chosen using an applicable solvent. Set inlet temperature on spray dryer to approximately 170 degrees F., using two fluid nozzles. This is dependent on the spray drying method and preparation method chosen. The material is atomized into small drops within a container containing liquid nitrogen. This causes the suspension drops to freeze instantaneously. The frozen drops or granules are collected and transferred to a freeze dryer for lyophilization. Collect the dry active powder. If necessary, the dry active powder can be further reduced in particle size by pulverizing and/or grinding.

At step 414, the dry active powder resulting from step 406, 408, 410, or 412 is prepared for application. Combine the dry active powder with sugar, sugar alcohol or binder (typically the same sugar, sugar alcohol, or binder that is used in panning the product) and mix for a uniform distribution. For this application, isomalt (sugar alcohol) will be used. While it is possible to apply the active dried powder without this preparation, a poor distribution may result. The proportions for preparing the active powder include: active dried mixture 50% and isomalt 50%.

In an alternative embodiment, cannabidiol (CBD) can be substituted for THC in the active liquid emulsion. In such embodiment, the chewing gum pieces have an encapsulated cannabinoid compound, and comprises a gum base or chicle, and an active emulsion comprising a cannabinoid resin comprising CBD, the active emulsion being a mixture comprising: greater than 30% by weight of water; less than approximately 50% by weight of gum Arabic as an emulsifier; no greater than approximately 4.7% by weight of d-alpha tocopherol; and sealing syrup of no more than 5% by weight of the gum being sealed to fully coat the chewing gum pieces, and wherein the chewing gum pieces are panned in the course of applying coatings thereto.

The cannabinoid resin can be in the form of an active powder, and microencapsulation of cannabinoids can be applied to the chewing gum.

The chewing gum pieces can also comprise a polishing wax/glaze of approximately 0.29% by weight, and the chewing gum pieces can be panned in the course of applying the polishing wax/glaze thereto. The polishing wax/glaze can comprise at least one of: carnauba wax powder, bees wax powder, confectioners glaze, and food grade shellac.

The chewing gum pieces can further comprise a sweetening agent such as: sugar, sorbitol, xylitol, maltitol, or isomalt, to produce sugar- or sugar-free chewing gum pieces.

The chewing gum pieces can be produced in extruded chewing gum, injection-molded chewing gum, or tableted chewing gum form.

The chewing gum pieces can have hollow centers, which may be filled with the active emulsion.

At step 416, an engrossing/finishing syrup is prepared with the ingredients listed below, to fully coat gum pieces. The syrup can be prepared with sugar or, for sugar-free gum, sugar alcohol. The amount of syrup required is approximately 25% or less of the total weight for gum pieces being sealed. Flavor and color can be added if desired, typically at 0.5-2% of the syrup weight; intensive sweetener such as sucralose, typically at 0.66% or less, of the syrup weight; acidulants typically at 12% or less of the syrup weight. The amount of sugar or alcohol is decreased to accommodate the added ingredients. The preferred ratio of ingredients for the engrossing/finishing syrup is: finely-ground sugar or isomalt-sugar alcohol (for sugar-free gum) 60%, water 37%, TicaPAN 311®, TicaPAN Quick Crunch®, gum Arabic or other functional matching binder/stabilizer 3%. Add binder/stabilizer to water and mix until completely dispersed. Begin heating and add isomalt to the solution in small increments, allowing the isomalt to dissolve. Continue adding isomalt to the solution until the measured amount has been added. Continue heating until temperature of solution reaches 212 F. Cool solution to proper temperature and adjust brix as required. Brix (symbol ° Bx) is the sugar content of an aqueous solution. A refractometer is used for measuring brix. For finishing with isomalt, the engrossing/finishing syrup should measure 60-63 Bx at temperature of 140-160 F. Brix may need to be adjusted depending on humidity, temperature and altitude. To increase Brix, add sugar alcohol incrementally and allow to fully dissolve, until desired Brix is achieved. To decrease brix, add water incrementally and allow to fully incorporate, until desired brix is achieved.

At step 418, the active dry powder prepared at step 414 and the engrossing/finishing syrup prepared at step 416 are applied to gum pieces. The syrup should be kept at 60-63 Bx and temperature of 140-160 F. With coating chamber spinning, apply syrup to the gum pieces until fully coated. Apply active powder to the wetted gum pieces. Only apply as much active powder as can be held by the wetted gum pieces. The pieces dry shortly after application of the active powder. Repeat until all of the active powder has been applied. Remove the coated pieces from coating pan and allow to dry for approximately 12 hours. The syrup should be kept at 60-63 Bx and temperature of 140-160 F. Apply syrup to gum pieces a little at a time until fully coated. Be careful not to over-saturate gum pieces or they will start to stick together. Allow gum pieces to dry between applications. Apply subsequent coats of the engross/finishing syrup, allowing gum pieces to dry between applications, until the desired finish weight is achieved and pieces are smooth. Remove coated pieces from panning chamber and allow to dry for approximately 12-48 hours.

For bioencapsulation of cannabinoids, gum pieces are coated in panning chamber with a specialized polymer, and the porosity of the specialized polymer can be selected for the benefit of controlled release of the active cannabinoids. If bioencapsulation is performed, the remaining steps are optional.

At step 420, a polishing wax/glaze is prepared using the following polishing ingredients: carnauba wax powder, bees wax powder, combination of bees wax and carnauba wax powder, or functional matching polishing agent (0.10% or less of the total weight for coated gum being polished). Confectioners glaze, food grade shellac, or functional matching glazing agent. The amount of glaze required is typically 0.29% or less of the total weight for coated gum being glazed.

At step 422, the polishing wax/glaze prepared at step 420 is applied to coated gum pieces. Place dry, coated gum pieces into panning chamber and turn panning chamber on to begin spinning. While panning chamber is spinning, sprinkle the measured amount of wax powder over gum pieces a little at a time to coat all of the pieces. As the chamber spins the wax will disperse over all the tumbling gum pieces. Allow panning chamber to continue spinning for up to 30 minutes but typically 10-15 minutes until a glossy finish is achieved. Additional wax may be applied if the desired gloss is not achieved. While panning chamber is spinning, apply glaze by slowly pouring over tumbling gum. Continue spinning till all gum pieces are evenly coated. Stop panning chamber and let coated gum pieces dry. Jog panning chamber by turning unit on and allowing to spin for approximately 5 seconds or less, and then turn back off. Repeat the jogging process approximately every 3 minutes until gum pieces are dry. Remove completed gum pieces from panning chamber and allow to condition for approximately 12 hours before packaging. Finished product should be conditioned in a room that is cool and dry.

Figure 5:
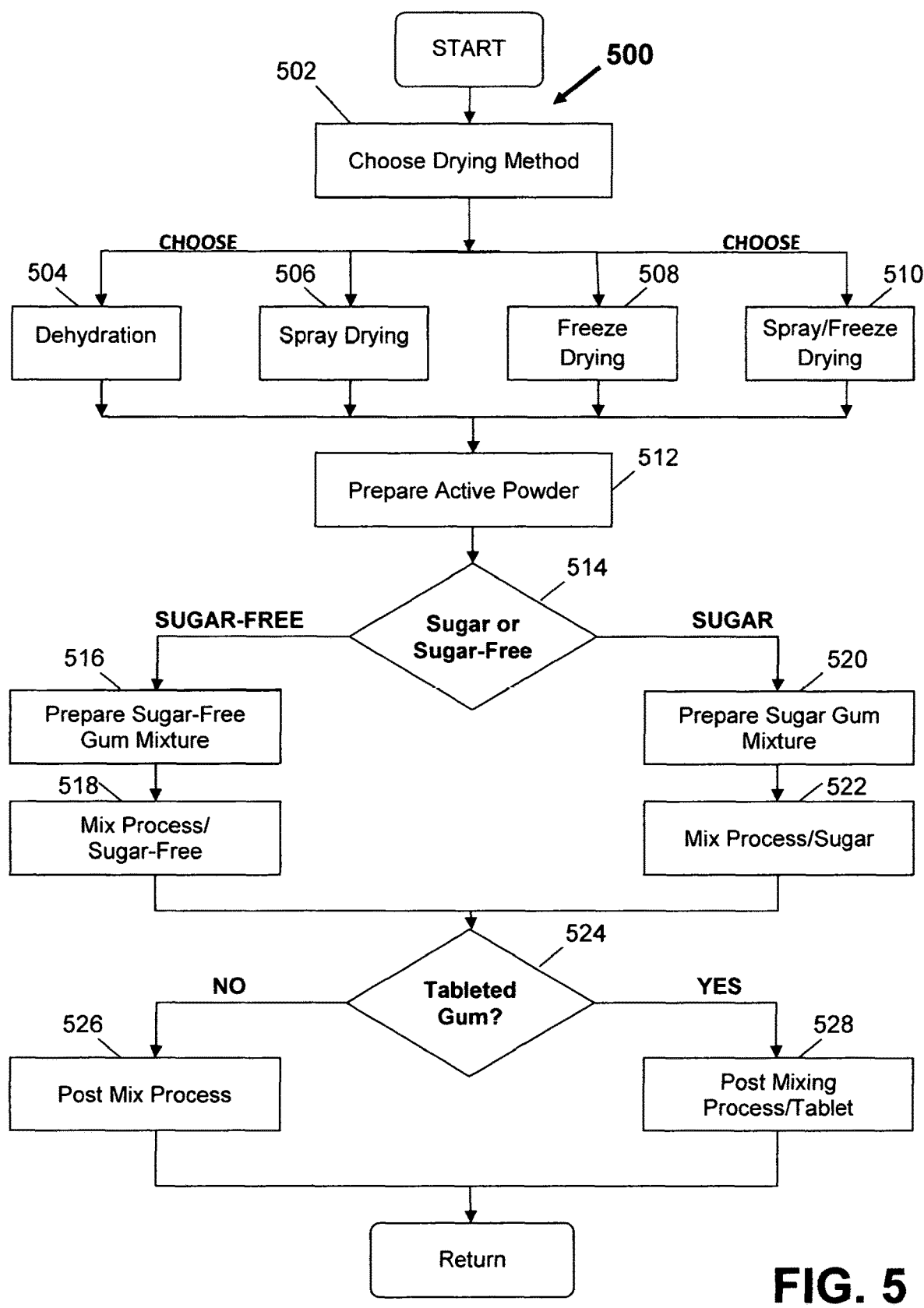
FIG. 5 is a sequence of operational steps for applying cannabinoids to chewing gum as an active powder applied to chewing gum in a gum mixture.

Directing attention to FIG. 5, microencapsulation of cannabinoids in an active powder applied to a chewing gum mixture is illustrated as process 500.

A determination is made at step 502 as to how to prepare an active liquid emulsion containing cannabinoids. Described herein are processes for heated dehydration, spray-drying, freeze-drying, and spray-freeze-drying, one of which may be selected for this embodiment of the present invention.

At step 504, for dehydration, an active liquid emulsion for dehydration is prepared. Measured amounts of cannabinoids and/or cannabinoid resin are combined with the ingredient proportions listed below and blended to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g Concentrate): water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine the gum Arabic with cold water and mix until fully incorporated. Add to the Gum Arabic mixture Vitamin E, cannabinoids and/or cannabinoid resin (concentrate), and polysorbate 80. The resultant mixture is heated to approximately 120 degrees F. for approximately 5-10 minutes and mixed to provide a homogeneous mixture. To perform nanoencapsulation, the mixture is blended using a high-shear mixer or sonication. The result is a nanoemulsion. Set oven temperature to 175 F. Pour active liquid emulsion onto an oven-safe nonstick sheet and spread evenly. Place in oven for approximately 45-90 minutes. As the active liquid emulsion dries, it rises from the non-stick sheet. After the active liquid emulsion is dried, remove it from the oven and allow cooling to room temperature. The resultant active dried mixture is turned into a fine powder by pulverizing and/or grinding.

Alternatively, at step 506, an active liquid emulsion for spray-drying is prepared. Combine measured amount of cannabinoids and/or cannabinoid resin with the proportions of listed ingredients below and blend to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g Concentrate). Additionally, one or more of the following ingredients can be used in the mixture which include, but are not limited to: modified food starch, soy protein, maltodextrin, surfactant and emulsifier (other than polysorbate 80), in an aqueous solution to create a slurry. The proportions of ingredients to be mixed are: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine the gum Arabic with cold water and mix until fully incorporated. Add to the gum Arabic solution vitamin E, cannabinoids and/or cannabinoid resin (concentrate), and polysorbate 80 to create a slurry. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Add additional aqueous solution as necessary for the atomization method chosen using an applicable solvent. Set inlet temperature to approximately 170 degrees F., using two fluid nozzles. This is dependent on the spray-drying method and preparation method chosen. Collect the dry active powder. If necessary, the dry active powder can be further reduced in particle size by pulverizing and/or grinding.

Alternatively, at step 508, an active liquid emulsion for lyophilizaton (freeze-drying) is performed. Combine measured amount of cannabinoids and/or cannabinoid resin with the listed ingredients and blend to create a homogeneous mix. The ratio of ingredients may vary from batch to batch based on the % of active cannabinoids present in the cannabinoids and/or cannabinoid resin used. The ingredient percentages noted are based on using cannabinoid resin with a concentration of 81.64% THC (816.4 mg THC/1 g concentrate). Additionally, one or more of the following ingredients can be used in the mixture which include, but are not limited to: modified food starch, gelatin, maltodextrin, chitosan, surfactant and emulsifier (other than polysorbate 80). The proportions to mix for the active liquid emulsion include: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine gum Arabic with cold water and mix until fully incorporated. Add to the gum Arabic solution vitamin E, cannabinoids and/or cannabinoid resin (concentrate), and polysorbate 80. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Pre-freeze the active mixture to approximately −40 to −80 C. Shell freezing is recommended. Cool condenser to approximately 20 C. Evacuate to at least 0.066 mBar, using vacuum pump. Gradually apply heat to allow sublimination to occur. Dry until the active mixture appears completely dry. Temperature and time may vary depending on the freeze drying method and preparation method chosen. The resultant dry active is converted into a fine powder by pulverizing and/or grinding.

Alternatively, at step 510, an active liquid emulsion is prepared for spray-freeze-drying (SFD). Combine measured amount of cannabinoids and/or cannabinoid resin with the listed ingredients and blend to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g concentrate). Additionally, one or more of the following ingredients can be used in the mixture which include, but are not limited to: modified food starch, soy protein, maltodextrin, surfactant and emulsifier (other than polysorbate 80), in an aqueous solution to create a slurry. The proportion of ingredients for the active liquid emulsion include: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, cannabinoid concentrate THC@0.00%-100%, from approximately 1.00% to approximately 50.00%, preferably 8.39%. Combine gum Arabic with cold water and mix until fully incorporated. Add to the gum Arabic solution vitamin E, cannabinoids and/or cannabinoid resin (concentrate), and polysorbate 80 to create a slurry. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Add additional aqueous solution as necessary for the atomization method chosen using an applicable solvent. Set inlet temperature on spray dryer to approximately 170 degrees F., using two fluid nozzles. This is dependent on the spray drying method and preparation method chosen. The material is atomized into small drops within a container containing liquid nitrogen. This causes the suspension drops to freeze instantaneously. The frozen drops or granules are collected and transferred to a freeze dryer for lyophilization. Collect the dry active powder. If necessary, the dry active powder can be further reduced in particle size by pulverizing and/or grinding.

At step 512, the dry active powder resulting from step 504, 506, 508, or 510 is prepared for application. Combine the Active Dried Powder with sugar, sugar alcohol or binder (typically the same sugar, sugar alcohol, or binder that is used in mixing the product) and mix for a uniform distribution. For this application, isomalt (sugar alcohol) will be used. While it is possible to apply the active dried powder without this preparation, a poor distribution may result. The proportions for preparing the active powder include: active dried mixture 50% and isomalt 50%.

At decision step 514, a selection is made between sugar-free gum and sugar gum. For sugar-free gum, steps 516 and 518 are performed. For sugar gum steps 520 and 522 are performed.

At step 516, a sugar-free gum mixture is prepared using the ingredients below. Combine the bulk sweeteners that are in powder form, including the active powder prepared as described above, for making the gum mixture and blend until fully incorporated. Typical mix time is 5 minutes, but could be more or less depending on mixer used and degree of incorporation. The balance of powder ingredients can be added and mixed for additional time until fully incorporated. For tableted chewing gum the liquid phase is lowered to 0.00-10.00% and is replaced with other ingredients in the formulation such as more bulk sweeteners: gum base 25.00-35.00%; bulk sweeteners (ie: sorbitol, xylitol, maltitol, isomalt, etc.) 40.00-55.00%; liquid phase (syrup) 8.00-20.00%; active liquid emulsion (% indicated is for active liquid emulsion only) 5.00-30.00%; intensive sweeteners 0.20-0.40%; flavors 1.00-2.00%; plasticizers 0.50-8.00%; and acids 0.00-2.00%.

At step 518, a mixing process is performed for sugar-free chewing gum. The following details the typical sequences for batch process, but sequences may change based on equipment, batch size, method (tableted gum, injection-molded gum), formula, etc. Also, the active powder mixture described above, without combining the other sugar alcohols, can be added at other times in the sequence. Mixing times can vary, depending on formulation, mixer, temperature, etc. The indicated bulk sweeteners may also include all or some of the powder ingredients used in the mixture in addition to liquids. If so, the ingredients indicated in the sequence steps should be eliminated as they are present in the combined mixture. Typical sequences for sugar-free chewing gum, but not limited to the following: Add gum base+liquid phase (rotate mixer until base softens). Then add ⅓ of bulk sweeteners+intensive sweeteners. Mix for approximately five minutes and add another ⅓ of bulk sweeteners. Mix for approximately five minutes again, then add flavors, plasticizers, acids and the remaining ⅓ of bulk sweeteners. Mix for approximately five minutes again and unload the homogenous mass from the mixer.

Returning to steps 520-522, the process steps for sugar gum are followed. At step 520, sugar gum mixture is prepared using the ingredients below. Combine the sugars that are in powder form, including the active powder mixture, and blend until fully incorporated. Typical mix time is approximately five minutes, but could be more or less depending on mixer used and degree of incorporation. The balance of powder ingredients can be added and mixed for additional time until fully incorporated. For tableted chewing gum the liquid phase is lowered to 0.00-10.00% and is replaced with other ingredients in the formulation such as more sugar. Typical formulations are: gum base 15.00-25.00%; sugar 45.00-65.00%; liquid phase (glucose) 15.00-23.00%; active liquid emulsion (% indicated is for active liquid emulsion only) 5.00-30.00%; flavors 0.60-2.00%; plasticizers 0.20-1.00%; and acids 0.00-2.00%.

At step 522, the mixing process for sugar gum is performed. The following details the typical sequences for batch process, but sequences may change based on equipment, batch size, method (ie: tableted gum, injection-molded gum), formula, etc. Also, the active powder mixture can be added at other times in the sequences. Mixing times can vary, depending on formulation, mixer, temperature, etc. The indicated sugar may also include all or some of the powder ingredients used in the mixture in addition to liquids. If so, the ingredients indicated in the sequence steps should be eliminated as they are present in the combined mixture. Add: ⅓ of the sugar (rotate), gum base, liquid phase. Mix for approximately five minutes. Add another ⅓ sugar and mix for approximately two minutes. Add: flavors, plasticizers, and acids. Mix for approximately three minutes. Add: the remaining ⅓ of the sugar and mix for approximately five minutes and remove the homogeneous mass from the mixer.

For bioencapsulation of cannabinoids, gum pieces are coated in panning chamber with a specialized polymer, and the porosity of the specialized polymer can be selected for the benefit of controlled release of the active cannabinoids.

At decision step 524, a selection is made between post mixing steps for extruded gum and injection-molded gum, or tableted chewing gum.

At step 526, the post-mixing process for extruded gum and injection-molded gum is performed. Typical operations in step 526 include but are not limited to curing, injection molding, extruding, curing, rolling and scoring, forming, coating and packaging.

At step 528, the post-mixing process for tableted chewing gum is performed. Typical operations include but are not limited to curing, milling, mixing with process-aid ingredients, added for tableting, in addition to optional dietary supplements. The prepared active powder mixture described above can be included in this step rather than earlier as described, depending on the desired release of cannabinoids. Additional ingredients added at this point may include stearate, typically magnesium or calcium and the like, in a proportion of approximately 0.50-5.00% of the total mixture. Silicon dioxide can also be added at this point in a proportion of approximately 0.10-2.00%. Additional operations include tableting, coating and packaging.

Figure 6:
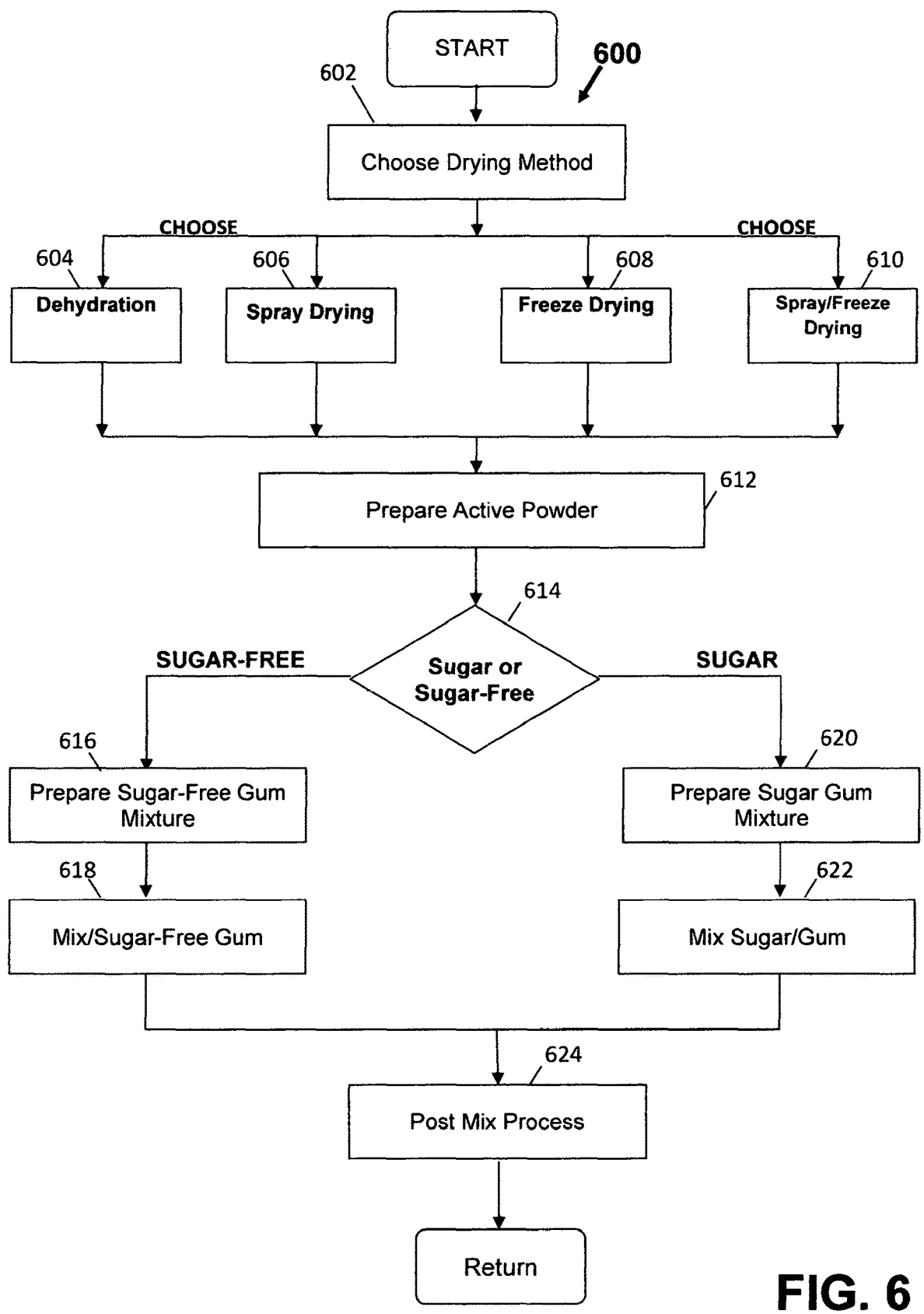
FIG. 6 is a sequence of operational steps for applying cannabinoids to chewing gum in a gum center powder filling.

Directing attention to FIG. 6, microencapsulation of cannabinoids in an active powder applied to chewing gum center powder filling is illustrated as process 600.

A determination is made at step 602 as to how to prepare an active liquid emulsion containing cannabinoids. Described herein are processes for heated dehydration, spray-drying, freeze-drying, and spray-freeze-drying, one of which may be selected for this embodiment of the present invention.

At step 604, for dehydration, an active liquid emulsion for dehydration is prepared. Measured amounts of cannabinoids and/or cannabinoid resin are combined with the ingredient proportions listed below and blended to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g Concentrate): water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, cannabinoid concentrate THC@0.00%-100%, from approximately 1.00% to approximately 50.00%, preferably 8.39%. Combine the gum Arabic with cold water and mix until fully incorporated. Add to the gum Arabic mixture Vitamin E, cannabinoids and/or cannabinoid resin (concentrate), and polysorbate 80. The resultant mixture is heated to approximately 120 degrees F. for approximately 5-10 minutes and mixed to provide a homogeneous mixture. To perform nanoencapsulation, the mixture is blended using a high-shear mixer or sonication. The result is a nanoemulsion. Set oven temperature to 175 F. Pour active liquid emulsion onto an oven-safe nonstick sheet and spread evenly. Place in oven for approximately 45-90 minutes. As the active liquid emulsion dries, it rises from the non-stick sheet. After the active liquid emulsion is dried, remove it from the oven and allow cooling to room temperature. The resultant active dried mixture is turned into a fine powder by pulverizing and/or grinding.

Alternatively, at step 606, an active liquid emulsion for spray-drying is prepared. Combine measured amount of cannabinoids and/or cannabinoid resin with the proportions of listed ingredients below and blend to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g Concentrate). Additionally, one or more of the following ingredients can be used in the mixture which include, but are not limited to: modified food starch, soy protein, maltodextrin, surfactant and emulsifier (other than polysorbate 80), in an aqueous solution to create a slurry. The proportions of ingredients to be mixed are: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine the gum Arabic with cold water and mix until fully incorporated. Add to the gum Arabic solution vitamin E, cannabinoids and/or cannabinoid resin (concentrate), and polysorbate 80 to create a slurry. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Add additional aqueous solution as necessary for the atomization method chosen using an applicable solvent. Set inlet temperature to approximately 170 degrees F., using two fluid nozzles. This is dependent on the spray-drying method and preparation method chosen. Collect the dry active powder. If necessary, the dry active powder can be further reduced in particle size by pulverizing and/or grinding.

Alternatively, at step 608, an active liquid emulsion for lyophilizaton (freeze-drying) is performed. Combine measured amount of cannabinoids and/or cannabinoid resin with the listed ingredients and blend to create a homogeneous mix. The ratio of ingredients may vary from batch to batch based on the % of active cannabinoids present in the cannabinoids and/or cannabinoid resin used. The ingredient percentages noted are based on using cannabinoid resin with a concentration of 81.64% THC (816.4 mg THC/1 g concentrate). Additionally, one or more of the following ingredients can be used in the mixture which include, but are not limited to: modified food starch, gelatin, maltodextrin, chitosan, surfactant and emulsifier (other than polysorbate 80). The proportions to mix for the active liquid emulsion include: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine gum Arabic with cold water and mix until fully incorporated. Add to the gum Arabic solution vitamin E, cannabinoids and/or cannabinoid resin (concentrate), and polysorbate 80. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Pre-freeze the active mixture to approximately −40 to −80 C. Shell freezing is recommended. Cool condenser to approximately 20 C. Evacuate to at least 0.066 mBar, using vacuum pump. Gradually apply heat to allow sublimation to occur. Dry until the active mixture appears completely dry. Temperature and time may vary depending on the freeze drying method and preparation method chosen. The resultant dry active is converted into a fine powder by pulverizing and/or grinding.

Alternatively, at step 610, an active liquid emulsion is prepared for spray-freeze-drying (SFD). Combine measured amount of cannabinoids and/or cannabinoid resin with the listed ingredients and blend to create a homogeneous mix. The ratio of ingredients may vary from batch to batch based on the percentage of active cannabinoids present in the cannabinoids and/or cannabinoid resin used. The ingredient percentages noted are based on using cannabinoid resin with a concentration of 81.64% THC (816.4 mg THC/1 g concentrate). Additionally, one or more of the following ingredients can be used in the mixture which include, but are not limited to: modified food starch, soy protein, maltodextrin, surfactant and emulsifier (other than polysorbate 80), in an aqueous solution to create a slurry. The proportion of ingredients for the active liquid emulsion include: water approximately 30.00% to approximately 60.00%, preferably 46.55%, gum Arabic approximately 20.00% to approximately 50.00%, preferably 39.18%; Vitamin E as d-Alpha Tocopherol from 0.00% to approximately 4.70%, preferably 4.70%, polysorbate 80 (surfactant/emulsifier) approximately 0.00% to approximately 1.50%, preferably 1.18%, and cannabinoid concentrate THC@0.00%-100%, from approximately 1.00% to approximately 50.00%, preferably 8.39%. Combine gum Arabic with cold water and mix until fully incorporated. Add to the gum Arabic solution vitamin E, cannabinoids and/or cannabinoid resin (concentrate), and polysorbate 80 to create a slurry. The resultant mixture can be heated to approximately 120 degrees F. for approximately 5-10 minutes and mixed to provide a homogeneous mixture, if necessary. To perform nanoencapsulation, the mixture is blended using a high-shear mixer or sonication. The result is a nanoemulsion. Add additional aqueous solution as necessary for the atomization method chosen using an applicable solvent. Set inlet temperature on spray dryer to approximately 170 degrees F., using two fluid nozzles. This is dependent on the spray drying method and preparation method chosen. The material is atomized into small drops within a container containing liquid nitrogen. This causes the suspension drops to freeze instantaneously. The frozen drops or granules are collected and transferred to a freeze dryer for lyophilization. Collect the dry active powder. If necessary, the dry active powder can be further reduced in particle size by pulverizing and/or grinding.

At step 612, the dry active powder produced in steps 604, 606, 608, or 610 is prepared for insertion into gum pieces as a gum center filling mixture. Combine the dry active powder with sugar, sugar alcohol or other ingredients that may be in the chewing gum powder filling. The following gum center filling mixture may vary based on expected color, flavor, nutritional supplement and texture profile desired. The proportions include: active dry powder 50%; polyol such as isomalt (for sugar-based gum use sugar) 40% or greater; citric acid 8% or greater; and flavor 2% or less.

At decision step 614, a selection is made between sugar-free gum and sugar gum. For sugar-free gum, steps 616 and 618 are performed. For sugar gum steps 620 and 622 are performed.

At step 616, a sugar-free gum mixture is prepared using the ingredients below. Combine the bulk sweeteners that are in powder form, including the active powder prepared as described above, for making the gum mixture and blend until fully incorporated. Typical mix time is 5 minutes, but could be more or less depending on mixer used and degree of incorporation. The balance of powder ingredients can be added and mixed for additional time until fully incorporated. For tableted chewing gum the liquid phase is lowered to 0.00-10.00% and is replaced with other ingredients in the formulation such as more bulk sweeteners: gum base 25.00-35.00%; bulk sweeteners (ie: sorbitol, xylitol, maltitol, isomalt, etc.) 40.00-55.00%; liquid phase (syrup) 8.00-20.00%; active liquid emulsion (% indicated is for active liquid emulsion only) 5.00-30.00%; intensive sweeteners 0.20-0.40%; flavors 1.00-2.00%; plasticizers 0.50-8.00%; and acids 0.00-2.00%.

At step 818, a mixing process is performed for sugar-free chewing gum. The following details the typical sequences for batch process, but sequences may change based on equipment, batch size, method (tableted gum, injection-molded gum), formula, etc. Also, the active powder mixture described above, without combining the other sugar alcohols, can be added at other times in the sequence. Mixing times can vary, depending on formulation, mixer, temperature, etc. The indicated bulk sweeteners may also include all or some of the powder ingredients used in the mixture in addition to liquids. If so, the ingredients indicated in the sequence steps should be eliminated as they are present in the combined mixture. Typical sequences for sugar-free chewing gum, but not limited to the following: Add gum base+liquid phase (rotate mixer until base softens). Then add ⅓ of bulk sweeteners+intensive sweeteners. Mix for approximately five minutes and add another ⅓ of bulk sweeteners. Mix for approximately five minutes again, then add flavors, plasticizers, acids and the remaining ⅓ of bulk sweeteners. Mix for approximately five minutes again and unload the homogenous mass from the mixer.

Returning to steps 620-622, the process steps for sugar gum are followed. At step 620, sugar gum mixture is prepared using the ingredients below. Combine the sugars that are in powder form, including the active powder mixture, and blend until fully incorporated. Typical mix time is approximately minutes, but could be more or less depending on mixer used and degree of incorporation. The balance of powder ingredients can be added and mixed for additional time until fully incorporated. For tableted chewing gum the liquid phase is lowered to 0.00-10.00% and is replaced with other ingredients in the formulation such as more sugar. Typical formulations are: gum base 15.00-25.00%; sugar 45.00-65.00%; liquid phase (glucose) 15.00-23.00%; active liquid emulsion (% indicated is for active liquid emulsion only) 5.00-30.00%; flavors 0.60-2.00%; plasticizers 0.20-1.00%; and acids 0.00-2.00%.

At step 622, the mixing process for sugar gum is performed. The following details the typical sequences for batch process, but sequences may change based on equipment, batch size, method (ie: tableted gum, injection-molded gum), formula, etc. Also, the active powder mixture can be added at other times in the sequences. Mixing times can vary, depending on formulation, mixer, temperature, etc. The indicated sugar may also include all or some of the powder ingredients used in the mixture in addition to liquids. If so, the ingredients indicated in the sequence steps should be eliminated as they are present in the combined mixture. Add: ⅓ of the sugar (rotate), gum base, liquid phase. Mix for approximately five minutes. Add another ⅓ sugar and mix for approximately two minutes. Add: flavors, plasticizers, and acids. Mix for approximately three minutes. Add: the remaining ⅓ of the sugar and mix for approximately five minutes and remove the homogeneous mass from the mixer.

For bioencapsulation of cannabinoids, gum pieces are coated in panning chamber with a specialized polymer, and the porosity of the specialized polymer can be selected for the benefit of controlled release of the active cannabinoids.

At step 624, a post-mix process for extruded gum with hollow center for filling is performed. The following details a typical post-mixing process but other processes are also possible. Operations in the post-mixing process may include curing gum pieces, extruding gum pieces with a hollow center, filling the hollow center with a metered quantity of the powder filling generated above that contains the active cannabinoids; rolling and scoring or forming gum pieces, coating them, and packaging them.

While the present invention has been described and illustrated in detail in the preferred embodiments, it is to be understood that numerous modifications can be made to the embodiments of the present invention without departing from the spirit thereof.

What is claimed is:

1. Chewing gum pieces having an encapsulated cannabinoid compound, comprising a gum base or chicle and an active emulsion having a cannabinoid resin comprising tetrahydrocannabinol (THC), the active emulsion being a mixture comprising:
    a) greater than 30% by weight of water;
    b) less than approximately 50% by weight of gum Arabic as an emulsifier;
    c) no greater than approximately 4.7% by weight of d-alpha tocopherol; and
    sealing syrup of no more than 5% by weight of the gum being sealed to fully coat the chewing gum pieces, and wherein the chewing gum pieces are panned in the course of applying coatings thereto.

2. The chewing gum pieces having an encapsulated cannabinoid compound in accordance with claim 1, wherein the cannabinoid resin is in the form of an active powder, and wherein microencapsulation of cannabinoids are applied to chewing gum.

3. The chewing gum pieces having an encapsulated cannabinoid compound in accordance with claim 1, further comprising a polishing wax/glaze of approximately 0.29% by weight, and wherein the chewing gum pieces are panned in the course of applying the polishing wax/glaze thereto.

4. The chewing gum pieces having an encapsulated cannabinoid compound in accordance with claim 3, wherein the polishing wax/glaze comprises at least one of the ingredients chosen from a group consisting of: carnauba wax powder, bees wax powder, confectioners glaze, and food grade shellac.

5. The chewing gum pieces having an encapsulated cannabinoid compound in accordance with claim 1, wherein the chewing gum pieces further comprise a sweetening agent chosen from a group consisting of: sugar, sorbitol, xylitol, maltitol, and isomalt, to produce chewing gum pieces chosen from a group consisting of: sugar and sugar-free.

6. The chewing gum pieces having an encapsulated cannabinoid compound in accordance with claim 1, wherein the chewing gum pieces are produced in a form chosen from a group consisting of: extruded chewing gum, injection-molded chewing gum, and tableted chewing gum.

7. The chewing gum pieces having an encapsulated cannabinoid compound in accordance with claim 1, wherein the chewing gum pieces have hollow centers and the hollow centers are filled with the active emulsion.

8. The chewing gum pieces having an encapsulated cannabinoid compound in accordance with claim 2, wherein the chewing gum pieces have hollow centers and the hollow centers are filled with the active emulsion.

9. Chewing gum pieces having an encapsulated cannabinoid compound, having a gum base or chicle and an active emulsion comprising a cannabinoid resin comprising cannabidiol (CBD), the active emulsion being a mixture comprising:
   a) greater than 30% by weight of water;
   b) less than approximately 50% by weight of gum Arabic as an emulsifier;
   c) no greater than approximately 4.7% by weight of d-alpha tocopherol; and
   sealing syrup of no more than 5% by weight of the gum being sealed to fully coat the chewing gum pieces, and wherein the chewing gum pieces are panned in the course of applying coatings thereto.

10. The chewing gum pieces having an encapsulated cannabinoid compound in accordance with claim 9, wherein the cannabinoid resin is in the form of an active powder, and wherein microencapsulation of cannabinoids are applied to chewing gum.

11. The chewing gum pieces having an encapsulated cannabinoid compound in accordance with claim 9 further comprising a polishing wax/glaze of approximately 0.29% by weight, and wherein the chewing gum pieces are panned in the course of applying the polishing wax/glaze thereto.

12. The chewing gum pieces having an encapsulated cannabinoid compound in accordance with claim 11, wherein the polishing wax/glaze comprises at least one of the ingredients chosen from a group consisting of: carnauba wax powder, bees wax powder, confectioners glaze, and food grade shellac.

13. The chewing gum pieces having an encapsulated cannabinoid compound in accordance with claim 9, wherein the chewing gum pieces further comprise a sweetening agent chosen from a group consisting of: sugar, sorbitol, xylitol, maltitol, and isomalt, to produce chewing gum pieces chosen from a group consisting of: sugar and sugar-free.

14. The chewing gum pieces having an encapsulated cannabinoid compound in accordance with claim 9, wherein the chewing gum pieces are produced in a form chosen from a group consisting of: extruded chewing gum, injection-molded chewing gum, and tableted chewing gum.

15. The chewing gum pieces having an encapsulated cannabinoid compound in accordance with claim 9, wherein the chewing gum pieces have hollow centers and the hollow centers are filled with the active emulsion.

16. The chewing gum pieces having an encapsulated cannabinoid compound in accordance with claim 10, wherein the chewing gum pieces have hollow centers and the hollow centers are filled with the active emulsion.

\* \* \* \* \*